United States Patent
Insanic et al.

(10) Patent No.: US 12,253,164 B2
(45) Date of Patent: Mar. 18, 2025

(54) ROTARY DECOUPLING ACTUATOR ASSEMBLY WITH INTEGRATED SPRING ASSISTANCE FOR BLOCKED ENGAGEMENT

(71) Applicant: KA Group AG, Zürich (CH)

(72) Inventors: Jasmin Insanic, Jönköping (SE); Jonas Bergvad, Jönköping (SE)

(73) Assignee: KA Group AG, Zürich (CH)

( * ) Notice: Subject to any disclaimer, the term of this patent is extended or adjusted under 35 U.S.C. 154(b) by 0 days.

(21) Appl. No.: 18/567,196

(22) PCT Filed: Jun. 7, 2022

(86) PCT No.: PCT/IB2022/055307
§ 371 (c)(1),
(2) Date: Dec. 5, 2023

(87) PCT Pub. No.: WO2022/259155
PCT Pub. Date: Dec. 15, 2022

(65) Prior Publication Data
US 2024/0288064 A1    Aug. 29, 2024

Related U.S. Application Data

(60) Provisional application No. 63/197,641, filed on Jun. 7, 2021.

(51) Int. Cl.
*F16H 61/04* (2006.01)
*F16H 61/32* (2006.01)
*F16H 61/28* (2006.01)

(52) U.S. Cl.
CPC ............. *F16H 61/04* (2013.01); *F16H 61/32* (2013.01); *F16H 2061/047* (2013.01); *F16H 2061/2892* (2013.01)

(58) Field of Classification Search
CPC .... F16H 61/04; F16H 61/32; F16H 2061/047; F16H 2061/2892; F16H 61/00;
(Continued)

(56) References Cited

U.S. PATENT DOCUMENTS 8,075,437 B2    12/2011  Rodgers, II
10,352,372 B2    7/2019  Weidemann et al.
(Continued)

FOREIGN PATENT DOCUMENTS

DE    102014224366 A1    6/2016
EP        2886911 B1    8/2016
(Continued)

OTHER PUBLICATIONS

International Search Report for Application No. PCT/IB2022/055307 dated Sep. 15, 2022, 2 pages.
(Continued)

*Primary Examiner* — Victor L MacArthur
(74) *Attorney, Agent, or Firm* — Howard & Howard Attorneys PLLC

(57) ABSTRACT

The present teachings generally provide for an actuator assembly to move between a decoupled position, and a coupled position. The actuator assembly includes a shift assembly including a gear connected to the motor, an input member in communication with the gear configured to transition between a first position and a second position; an output member operatively connected to the input member and configured to move a distance defining a stroke length between a disengaged position and an engaged position; and a biasing member connecting the input member to the output member. The input member rotates from the first position to the second position relative to the output member, increasing a tension of the biasing member due to an interference causing a blocked condition. The biasing member rotates the
(Continued)

output member in a releasing condition upon clearance of the interference such that the output member rotates through the stroke length.

17 Claims, 10 Drawing Sheets

(58) Field of Classification Search
CPC . F16H 1/16; F16H 1/203; F16H 19/06; F16H 2048/343; F16H 2057/0213; F16H 2063/3089; F16H 33/02
See application file for complete search history.

(56) References Cited

U.S. PATENT DOCUMENTS

| | | | |
|---|---|---|---|
| 10,436,318 B2 * | 10/2019 | Cha | F16H 61/32 |
| 2003/0217617 A1 | 11/2003 | Sakamoto et al. | |
| 2010/0276245 A1 | 11/2010 | Umeno et al. | |
| 2011/0138944 A1 | 6/2011 | Mohlin et al. | |
| 2017/0248172 A1 | 8/2017 | Weidemann et al. | |
| 2017/0314643 A1 | 11/2017 | Hudson et al. | |
| 2019/0003586 A1 | 1/2019 | Merienne et al. | |
| 2019/0128417 A1 | 5/2019 | Schulte et al. | |
| 2020/0254872 A1 | 8/2020 | Pritchard et al. | |
| 2020/0369253 A1 | 11/2020 | Shah et al. | |

FOREIGN PATENT DOCUMENTS

| | | |
|---|---|---|
| EP | 3105463 B1 | 9/2020 |
| EP | 3347625 B1 | 9/2020 |
| WO | 2020046974 A1 | 3/2020 |

OTHER PUBLICATIONS

Machine-assisted English language abstract for DE 10 2014 224 366 A1 extracted from espacenet.com database on Dec. 6, 2023, 4 pages.

English language abstract for EP 3 347 625 B1 extracted from espacenet.com database on Dec. 6, 2023, 2 pages.

* cited by examiner

ROTARY DECOUPLING ACTUATOR ASSEMBLY WITH INTEGRATED SPRING ASSISTANCE FOR BLOCKED ENGAGEMENT

CROSS-REFERENCE TO RELATED APPLICATIONS

This application is the National Stage of International Patent Application No. PCT/IB2022/055307 filed on Jun. 7, 2022, which claims priority to and the benefit of U.S. Provisional Application No. 63/197,641 filed on Jun. 7, 2021. The entire contents of these applications are incorporated herein by reference in their entirety.

TECHNICAL FIELD

The teachings generally relate to an electric rotary actuator assembly with an integrated spring assist, typically in non-synchronized mechanisms.

BACKGROUND

Generally, gear actuation is done manually or with the assistance of an actuator. In actuators utilizing separate actuation assemblies, the integration of the separate components into a gearbox is complex and application specific, presenting the challenge of utilizing one actuation assembly into several applications.

A dog clutch may be used for applications where two shafts rotating with different speeds are placed into and out of communication with each other to transfer power from one shaft to another. The common design is one of the shafts having external teeth mating with internal teeth of a sliding sleeve (ring) on the other shaft and when the teeth are engaged both shafts will rotate together with the same speed. The force needed to connect the shafts by moving the sleeve to the engaged position when the shafts are rotating with different speed varies depending on the teeth alignment (how much the teeth are blocking each other) from a very high force when completely blocked and all the way down to zero if they are not blocking each other at all.

Typically, the actuation member is configured to linearly move a fork connected with a dog-clutch between a plurality of positions. The actuation assembly is operated with a manual force (e.g. a standard gear box where a user selects gears by manually moving a gear selector from position to position) or with an actuator to move a gear between positions. Given the nature of gear to gear actuation, particularly in gear assemblies without synchronizers, when the dog-clutch is being moved from a disengaged position into engaged with a receiving gear, there is a momentary blockage or misalignment of gear teeth on the dog clutch and the gear teeth on the receiving gear. In this moment of misalignment, the actuator is pressing the sliding gear against the receiving gear but the dog clutch is not entering the receiving gear, generating resistance against the actuator assembly since the dog clutch teeth and the receiving gear teeth are not aligned. The time window for engagement is short. If time window is not utilized, a stronger motor is required as force becomes higher to force the teeth of the dog clutch into alignment with the teeth of the receiving gear. This uses a larger force and operates slower, which may not seat the dog clutch into the receiving gear as far, or cause premature wear and damage on the system.

It would be attractive to have an actuation system which is low cost with a simple integration into several different systems and types on gearboxes. It would be attractive to have a system which provided fast shifts with low force and high acceleration, preventing damage and premature wear. It would be attractive to have a system with an integrated mechanism. It would be attractive to connect and disconnect the dog clutch when requested with an actuator that moves an engagement mechanism by rotating an input shaft connecting the actuator with the engagement mechanism.

SUMMARY

The present teachings solve one or more of the present needs by providing an electronic actuation system with low cost, simple integration into a variety of applications, and fast actuation between positions with exceptional penetration.

The present teachings generally provide for an actuator assembly comprising a support, a motor connected to the support, and a shift assembly operatively connected with the motor to move between a decoupled position, and a coupled position with a plurality of intermediate positions between the decoupled position and coupled position. The shift assembly includes a gear connected to the motor, an input member in communication with the gear with the input member having a tab with the input member configured to transition between a first position and a second position, the input member being in the first position when the shift assembly is in the decoupled position; an output member having a stop with the output member operatively connected to the input member and configured to move a distance defining a stroke length between a disengaged position and an engaged position, the output member being in the disengaged position when the shift assembly is in the decoupled position; and a biasing member connecting the input member to the output member. The biasing member in held in a pretensioned state when the input member is in the first position and the output member is in the disengaged position such that the stop of the output member engages the tab of the input member. The input member rotates in a first direction from the first position to the second position relative to the output member, separating the tab of the input member from the stop of the output member and increasing a tension of the biasing member between the input member and the output member, and the output member remains in the disengaged position due to an interference causing a blocked condition. The biasing member rotates the output member in the first direction relative to the input member in a releasing condition upon clearance of the interference such that the output member rotates through the stroke length from the disengaged position to the engaged position with the stop of the output member re-engaging the tab of the input member while the input member remains in the second position to place the shift assembly in the coupled position.

The present teachings further provide a method of operating an actuator assembly. The actuator assembly comprising a support, a motor connected to the support, a shift assembly operatively connected with the motor to move between a decoupled position, and a coupled position with a plurality of intermediate positions between the decoupled and coupled positions, the shift assembly including: a gear connected to the motor, an input member in communication with the gear with the input member having a tab with the input member configured to transition between a first position and a second position, the input member being in the first position when the shift assembly is in the decoupled position, an output member having a stop with the output member operatively connected to the input member and configured to rotate an angular distance corresponding to a stroke length between a disengaged position and an engaged position, the output member being in the disengaged position when the shift assembly is in the decoupled position, and a biasing member connecting the input member to the output member wherein the biasing member in held in a pretensioned state when the input member is in the first position and the output member is in the disengaged position such that the stop of the output member engages the tab of the input member. The method comprising: actuating the motor in a first direction to rotate the gear and the input member from the first position to the second position; increasing tension of the biasing member between the input member and the output member, separating the tab of the input member from the stop of the output member, the output member remaining in the disengaged position when an interference is present causing a blocked condition; clearing the blocked condition; releasing the tension of the biasing member and rotating the output member through the stroke length from the disengaged position to the engaged position in the first direction; and re-engaging the stop of the output member with the tab of the input member while the input member remains in the second position to place the shift assembly in the coupled position.

DETAILED DESCRIPTION

Figure 1:
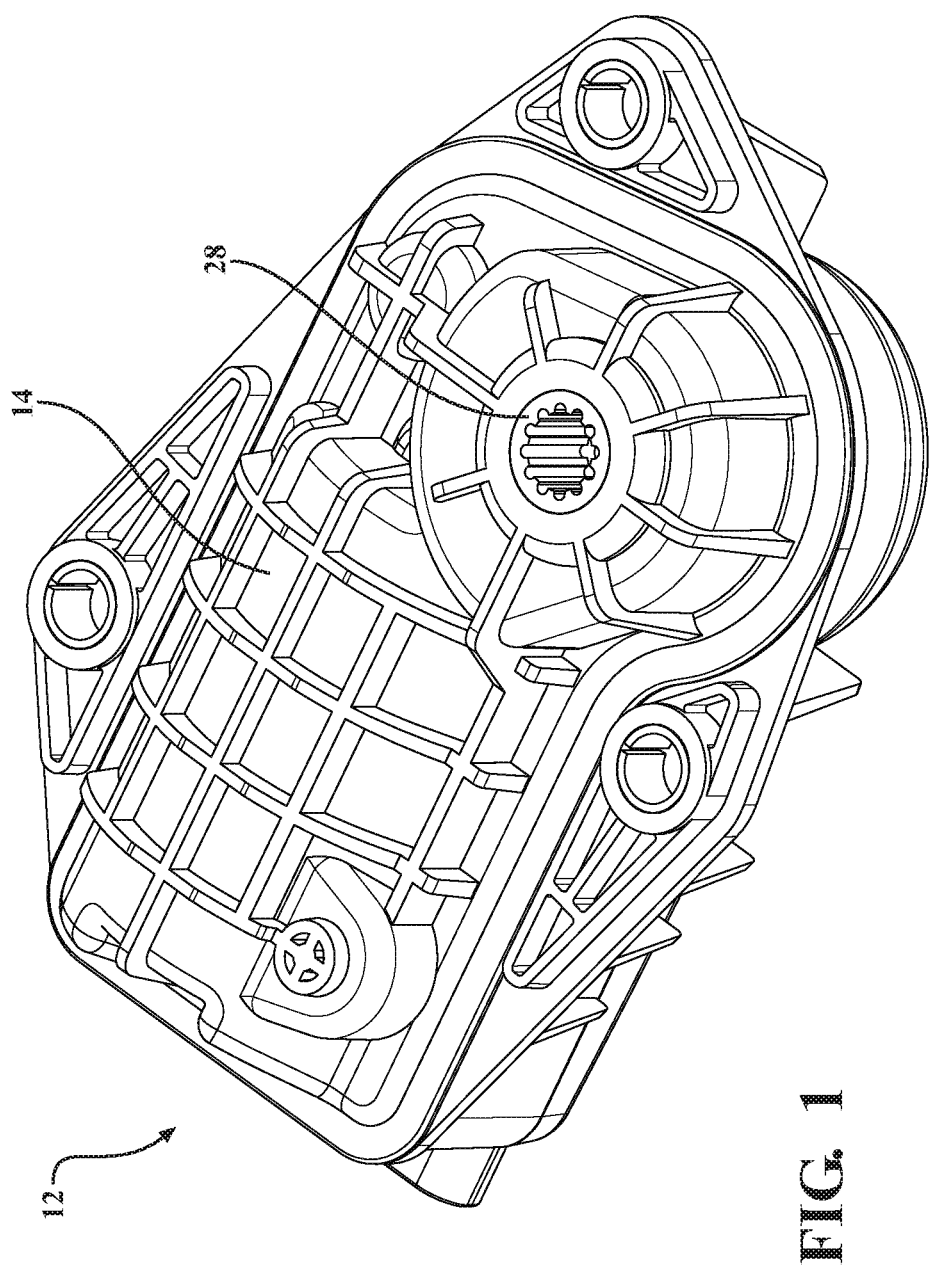
FIG. 1 is a perspective view of an electric actuator assembly.

The various versions of the present disclosure will be described in detail with reference to the accompanying drawings. Wherever possible, the same reference numbers will be used throughout the drawings to refer to the same or corresponding parts. References made to particular examples and implementations are for illustrative purposes and are not intended to limit the scope of the present disclosure.

The present teachings may relate to an actuator assembly 12. The actuator assembly 12 may function to provide a rotational force onto an input member connected with a gear assembly. The actuator assembly 12 may be connected with any suitable engagement mechanism 60 which would convert the rotational output of the actuator assembly 12 into linear movement to change gears in a gear assembly 64. In some examples, the actuator assembly 12 may assist in coupling and decoupling coaxial shafts within a gear assembly 64, such as a dog clutch configuration. The actuator assembly 12 may be configured to assist in transitioning a dog clutch 68 between a disengaged position of the gear assembly (corresponding to a decoupled position 40 of the actuator system 10) and an engaged position of the gear assembly (corresponding to a coupled position 44 of the actuator system 10).

The actuator assembly 12 may include a motor 16 and a shift assembly 20. The actuator assembly 12 may include a controller 52 and optionally an input device. The actuator assembly 12 may be connected with a controller 52. The controller 52 may function to selectively actuate the actuator assembly 12 by signaling the shifter assembly 20 to move between positions 40, 44. In some examples, controller 52 may be integrated into the actuator assembly 12. In other examples, controller 52 may be externally coupled with the actuator assembly 12. In some other examples, the actuator assembly 12 may include a plurality of controllers with both internal and external controllers 52. In some examples, the controller 52 may be connected with an input device, such as a button, lever, trigger, footswitch, or the like, for a user to select engagement or disengagement. Alternatively, in other examples, the controller 52 may automatically actuate the actuator assembly 12.

Figure 2:
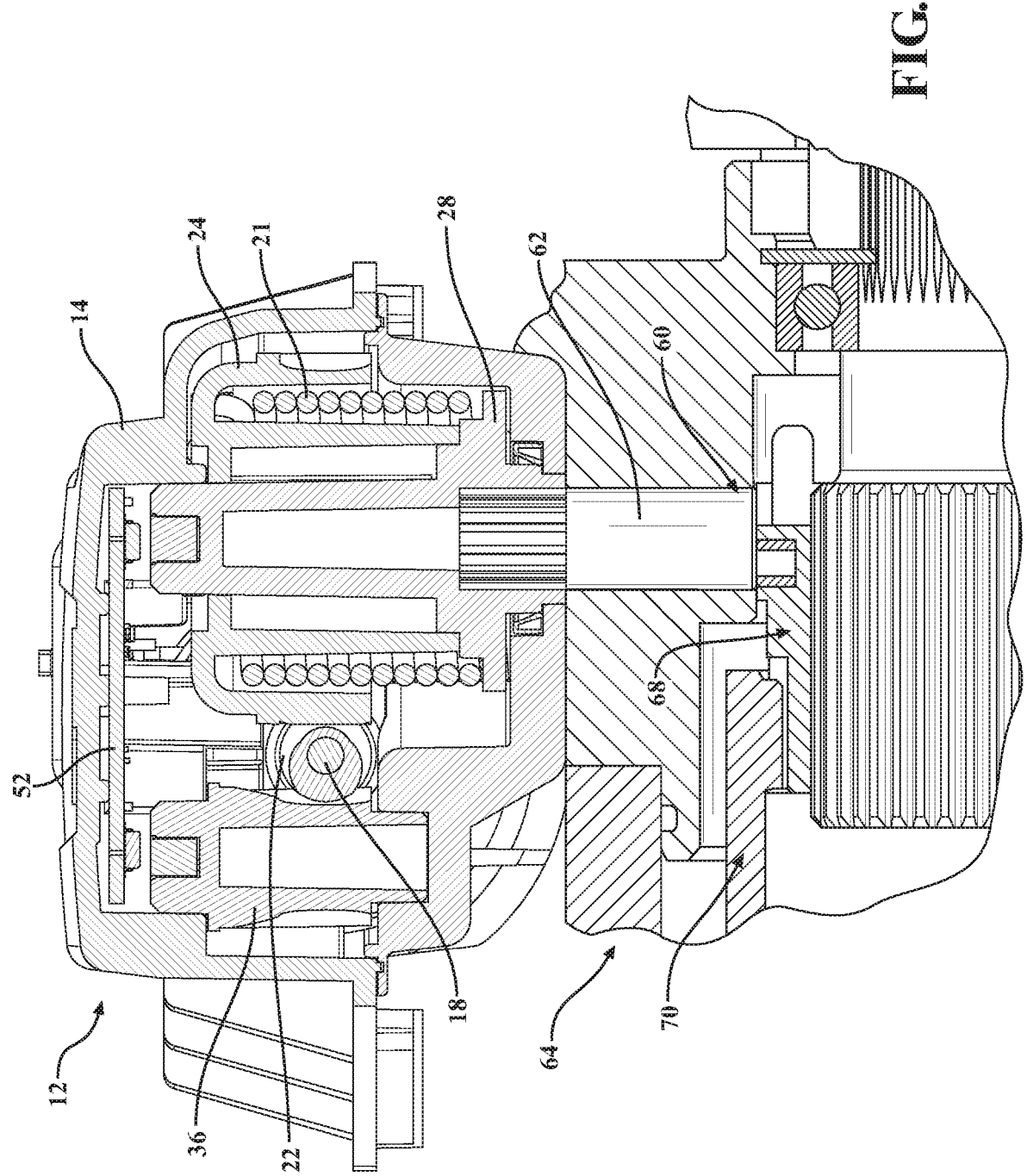
FIG. 2 is partial cross sections of the actuator assembly connected with an engagement mechanism and a gear assembly.

The actuator assembly 12 may be operatively connected with an engagement mechanism 60 such as seen in FIG. 2. The actuator assembly 12 may assist the engagement mechanism 60 to transition a dog clutch 68 between a disengaged position and an engaged position, and vice versa. In some examples, the actuator assembly 12 may be connected directly with the dog clutch 68 to assist in moving the dog clutch between the engaged and disengaged position. In other examples, the actuator assembly 12 is connected with the engagement mechanism 60 which is configured to use the rotational output of the output member 28 of the actuator assembly 12 and convert the rotational movement into linear movement on the dog clutch to switch the dog clutch between positions. In some examples, the engagement mechanism 60 may include a shift member 62 configured to be received by the actuator output member 28. The actuator assembly 12 may be configured to attach to a surface 66 of the gear assembly 64, the shift member 62 of the engagement mechanism configured to protrude the surface 66 allowing the actuator output member 28 to receive the shift member 62. The engagement mechanism 60 may be configured to be operatively connected with the dog clutch 68 in order to move the dog clutch 68 into and out of connection with the receiving gear 70. In some examples, the engagement mechanism 60 may be connected with an outer surface or sleeve of the dog clutch.

The actuator assembly 12 may be attached to the gear assembly 64. The gear assembly 64 may be a transmission, a transfer case, an axle arrangement, a gearbox, the like, or a combination thereof. The actuator assembly 12 may be used automobiles, autonomous vehicles, robots, trucks, marine vessels, or any other vehicle or machine that utilizes moving gears. The actuator assembly 12 may be used on any device that couples two rotating objects such as shafts, gears, or similar rotating components. For example, the actuator assembly 12 may be configured to attach with an engagement mechanism 60 to move a dog clutch 68 in and out of engagement with a receiving gear 70. The actuator assembly 12 may be used in conjunction with multiple actuator assemblies, multiple gear-moving assemblies, or both. For example, a transmission may have a first actuator assembly which actuates a first gear-moving assembly to move between a first gear and a second gear, and a second actuator assembly which actuates a second gear-moving assembly between a third gear and a fourth gear. It is contemplated that each actuator assembly may move a gear-moving assembly connected with a dog clutch into communication with one or more receiving gears.

Figure 3:
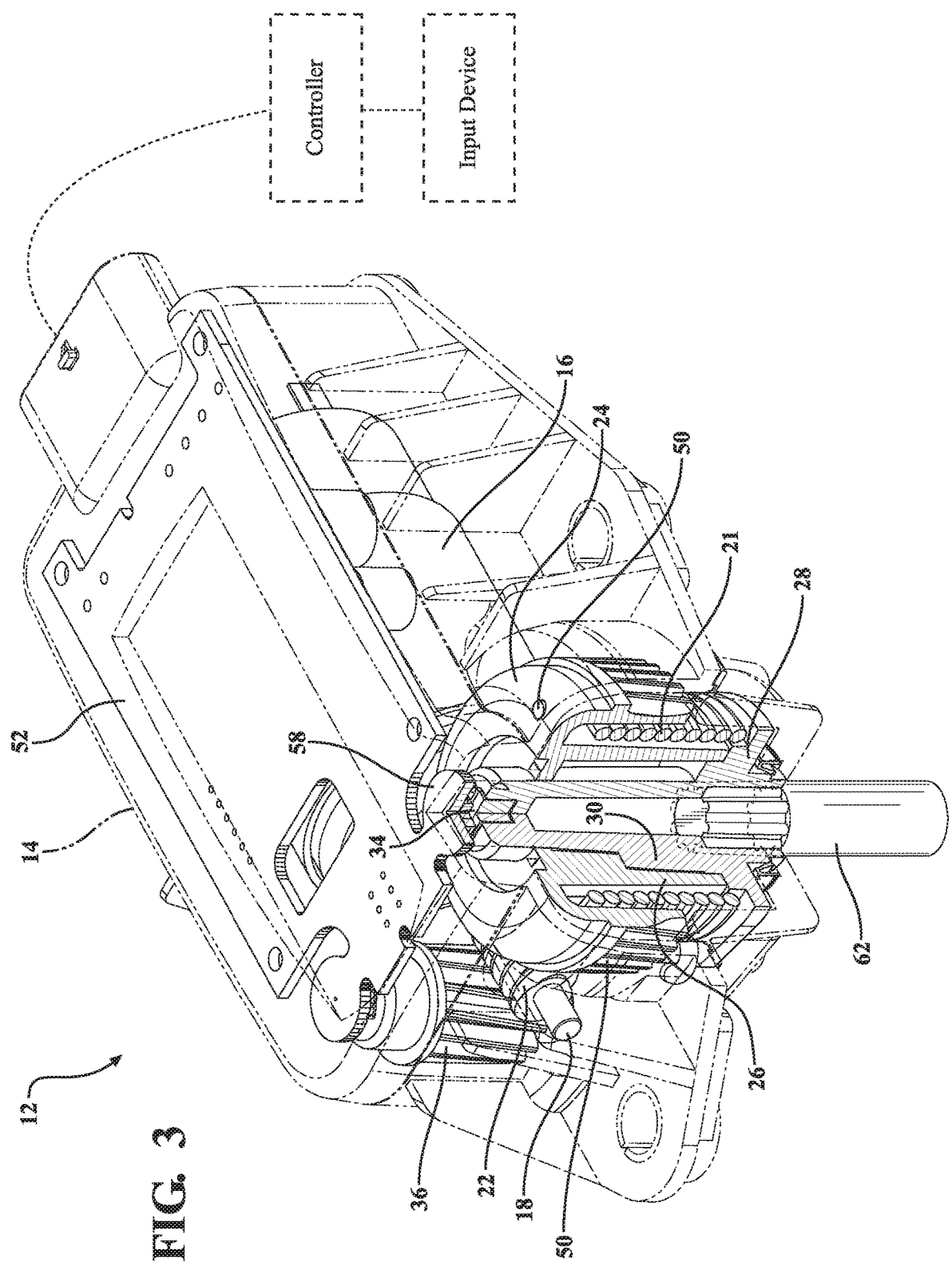
FIG. 3 is a partial cross section of the actuator assembly connected with a controller.

FIGS. 1-3 show various perspective views of the actuator assembly 12. The actuator assembly 12 includes a support 14 shown as a housing. The support may include a base and a cover. As seen in FIG. 2, the actuator assembly 12 may be configured to be operatively connected with a dog clutch 68 within a gear assembly 64. As used throughout the present application, dog clutch 68 refers to a dog clutch and a sleeve connected to the dog clutch. The sleeve may be integrated with the dog clutch 68 and the engagement mechanism 60 may be directly connected with the dog clutch sleeve. Further, in some examples, the actuator assembly 12 may be directly coupled with the dog clutch 68. In other embodiments, the actuator assembly 12 may be coupled with the dog clutch 68 through an engagement mechanism 60. The shift assembly 20 may be completely housed within the support 14 of the actuator assembly 12, separate from the engagement mechanism 60 and/or the gear assembly 64. The support 14 may be configured as a base which the motor 16, the shift assembly 20, or both are mounted to.

The actuator assembly 12 includes a shift assembly 20. The shift assembly 20 may function to move between an decoupled position 40, an intermediate position 42, and a coupled position 44, operatively coupled with and configured to move a dog clutch 68 from a disengaged position to an engaged position. The shift assembly 20 may function to rotate an output member 28, which may be configured to rotate a portion of an engagement mechanism 60 to translate rotational movement into linear movement within a gear assembly 64, moving a dog clutch 68 between positions. The shift assembly 20 may function to assist in overcoming a blockage condition caused by an interference between a dog clutch 68 and a receiving gear 70. The shift assembly 20 is configured to transition to and from the decoupled position 40 and the coupled position 44 through a plurality of intermediate positions 42, however, for purposes of this application "intermediate position" encompasses the plurality of possible positions between the decoupled position 40 and the coupled position 44. The coupled position 44 of the shift assembly 20 corresponds with the engaged position of the dog clutch 68, and the decoupled position 40 corresponds with the disengaged position of the dog clutch 68. The shift assembly 20 may include an actuator gear (also known as gear) 22, an input member 24, an actuator output member 28, and a biasing member 21.

Figure 5:
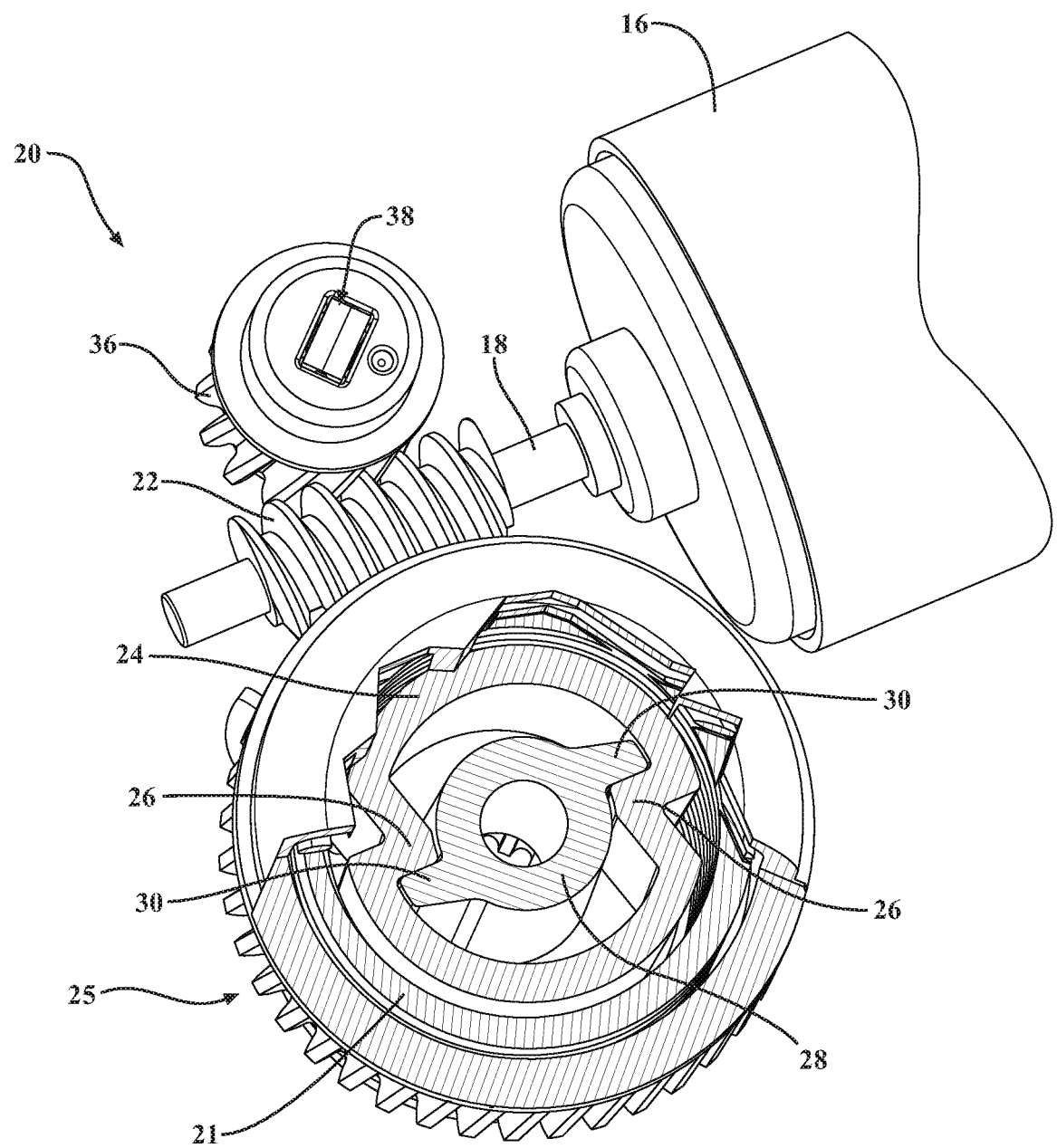
FIG. 5 illustrates a top view of the shift assembly.

The shift assembly 20 may be connected with the motor 16 through output 18 of the motor 16. The motor 16 may function to receive power from a controller 52 to actuate the shift assembly 20 to move between positions 40, 44. For example, as shown in FIG. 3, the actuator assembly 12 may be connected with controller 52. The motor 16 may function to provide rotational power to the shift assembly 20. For example, as shown in FIG. 5, the output member 18 of the motor 16 is connected with actuator gear 22, such that when the motor 16 is actuated, the actuator gear 22 will spin, turning the input member 24 from a first position 72 to a second position 74 (additionally, see FIGS. 6A and 6B). The output 18 of the motor 16 may have any suitable size or shape to connect with the shift assembly 20. For example, the output 18 may be a shaft, an axle, a coupler, or the like, which is received by the shift assembly 20. In some examples, such as shown in FIG. 3, the motor 16 may receive an actuation power from a controller 52, which actuates the motor 16, rotating the output 18 connected to the actuator gear 22, so that the actuator gear 22 rotates the input member 24 and the actuator output member 28. In some examples, when the input member 24 is rotated in a first direction between the first position 72 and the second position 74, but there is a blockage condition caused by an interference, the input member 24 further tensions the biasing member 21 which provides additional rotational force to the actuator output member 28 to transition the engagement mechanism 60/dog clutch 68 between positions. In some examples, when a blockage condition is absent, the motor 16 rotates the input member 24 in the first direction to rotate the actuator output member 28, transitioning the shift assembly 20 from the decoupled position 40 to the coupled position 44.

The actuator assembly 12 includes a motor 16 and an output 18. The motor 16 may function to rotate the output 18, driving the actuator gear 22 of the shift assembly 20. The motor 16 may function to receive power to rotate clockwise or counterclockwise depending on the movement required to move the shift assembly 20 between positions 40, 42, 44 of the shift assembly 20. The motor may be mounted to the housing 14. The motor 16 is an electric motor. The motor 16 may include a gear set, such as a planetary gear set, which may function to amplify torque generated by the motor 16 to increase the force and/or speed of the motor 16.

The shift assembly 20 includes an actuator gear 22 connected with the output 18 of the motor 16. The actuator gear 22 may function to rotate the input member 24 and a motor sensor gear 36 when the motor 16 is actuated. The actuator gear 22 may be any suitable gear design for rotating a complementary gear. For example, some non-limiting examples of the actuator gear 22 may be a spur gear, a helical gear, a double helical gear, a worm gear, or the like. The actuator gear 22, as shown in FIGS. 2-5, is a worm gear, however, alternative configurations are contemplated. The actuator gear 22 may be non-backdrivable. The actuator gear 22 is configured to rotate when the motor 16 is actuated, turning the input member 24 (and motor sensor gear 36) between positions 72, 74 to move the shift assembly between the decoupled position 40 and coupled position 44.

The shift assembly 20 includes an input member 24 operatively connected with the actuator gear 22. The input member 24 may function to assist in turning the actuator output member 28. The input member 24 may function to assist in loading tension into the biasing member 21. The input member 24 may be a complementary geared wheel to be rotated by the actuator gear 22. The input member may have any suitable gear design for being rotated by the actuator gear 22. For example, some non-limiting examples of the input member 24 gear design may be a track gear, a spur gear, a helical gear, a double helical gear, a worm gear, or the like. For example, as shown in FIGS. 5-9, the input member 24 is configured as a worm wheel. The input member 24 may be configured to rotate a predetermined distance between the decoupled position 40 and the coupled position 44. The predetermined distance may correspond to the rotational distance (i.e. angle of rotation corresponding to a distance) to move the shift assembly 20 between the decoupled position 40 and the coupled position 44, corresponding to a stroke length. The stroke length may be related to moving the dog clutch 68 between a disengaged position and an engaged position with the receiving gear 70. The input member 24 and the output member 28 maintain a pre-loaded force on the biasing member 21. Further, as the input member 24 is turned in the first direction from the first position 72 to the second position 74 relative to the output member 28 during a blocked condition causing an additional amount of force to be loaded into the biasing member. In some examples, the predetermined distance of rotation and/or the predetermined load placed on the biasing member 21 may correspond to the stroke length of the engagement mechanism 60. In some examples, the input member 24 is rotated a specific distance required to move the actuator output member 28 and the shift member 62 of the engagement mechanism 60 connected with dog clutch 68 from position to position. When there is a blockage condition between the dog clutch 68 and the receiving gear 70, the input member 24 will turn, and subsequently tension the biasing member 21 about the actuator output member 28, loading a force into the biasing member 21 to allow the actuator output member 28 to quickly and forcefully rotate when the blockage condition (corresponding to intermediate position 42) is removed, causing the dog clutch 68 to deeply and fully engage the receiving gear 70. To additionally tension the biasing member 21, the input member 24 includes a biasing member mount 50 where one end of the biasing member 21 is connected with the input member 24. The input member 24 includes one or more tabs 26 for assisting in holding the shift assembly 20 in the decoupled position 40 and in turning the shift assembly 20 from the coupled position 44 back to the decoupled position 40, described further below.

The shift assembly 20 includes an actuator output member 28 (also referred to as output member) operatively connected with the input member 24. The actuator output member 28 may function to rotate when the input member 24 and biasing member 21 are rotated. The actuator output member 28 may convert rotational movement of the motor 16 into a rotational output configured to move the engagement mechanism 60 between positions. The actuator output member 28 may function to receive a shift member 62 of an engagement mechanism 60 connected with a gear assembly 64, the engagement mechanism 60 converting the rotational output of the actuator output member 28 through the shift member 62 into linear movement within the gear assembly 64. The actuator output member 28 may be configured to be disposed axially within an opening of the input member 24 and the biasing member 21. The actuator output member 28 may be operatively coupled with the input member 24 through the biasing member. The actuator output member 28 member includes a biasing member mount 48 for connecting with the biasing member 21. The actuator output includes one or more stops 30 for pre-tensioning the biasing member 21 and assisting in moving the shift assembly 20 from the coupled position 44 back to the decoupled position 40, described further below. An O-ring 46 is disposed between the output member 28 and the support 14.

The shift assembly 20 includes a biasing member 21 operatively coupling the input member 24 and the actuator output member 28. The biasing member 21 may function to assist the shift assembly 20 in rapidly moving the output member 28 between the disengaged position 76 and the engaged position 78. The biasing member 21 may be configured to function to assist the engagement mechanism 60 in overcoming a momentary blockage condition by storing potential energy in the biasing member 21 when tensioned and releasing that energy as a force onto the actuator output member 28 (FIGS. 7A-7D), operatively connected with the engagement mechanism 60. In some examples, the biasing member 21 is a torsion spring. The biasing member 21 has a pre-loaded force and may be configured to have a length in an expanded state configured to rotate the actuator output member 28 through a full engagement rotation. The pre-loaded biasing member 21 may be slightly tensioned.

Throughout the present application "expanded" refers to the biasing member 21 in a state of substantial expansion, encompassing the slight tension of a preload. The biasing member is preloaded in the shift assembly 20 to transition the dog clutch 68 between positions when there are no blockages, however, the biasing member is arranged to allow the input member 24 to turn, even when there is a blockage preventing actuator output member 28 from rotating. The tabs 26 and the stops 30 hold the biasing member 21 and the input member 24 in the preloaded state. When the blockage condition is present, and the input member 24 has rotated from the first position 72 to the second position 74, the actuator output member 28 is in the disengaged position 76. In disengaged position 76, the actuator output member 28 may be prevented from rotating, and the biasing member 21 stores additional rotational energy of the motor 16 provided by the rotation of the input member 24. The additional stored force in the biasing member 21 is applied by the actuator output member 28 into a consistent force to rotate the shift assembly 20 between the decoupled position 40 and the coupled position 44 as the blockage condition is cleared, moving the output member 28 from the disengaged position 76 to the engaged position 78. The biasing member 21 may be configured to generate a substantial force to assist in the alignment and engagement of a dog clutch 68 with a receiving gear 70. The application of force by the biasing member 21 onto the actuator output member 28 may be configured to move the engagement mechanism 60 between the disengaged position and the engaged position, providing sufficient force to drive the dog clutch 68 into deep engagement with a receiving gear 70 quickly, when the blockage condition is cleared. Further, the biasing member 21 may be configured to have a length that corresponds with the distance the actuator output member 28 must move to transition between the disengaged position 76 and the engaged position 78, to move the actuator assembly from the decoupled position 40 to the coupled position 44, moving the engagement mechanism 60 between the disengaged position and the engaged position. The length of biasing member 21 corresponds with the application based on the distance required to move between positions 40, 44. The biasing member 21 provides a persistent application force applied through the input member 24 and actuator output member 28 during rotation.

Figure 6A:
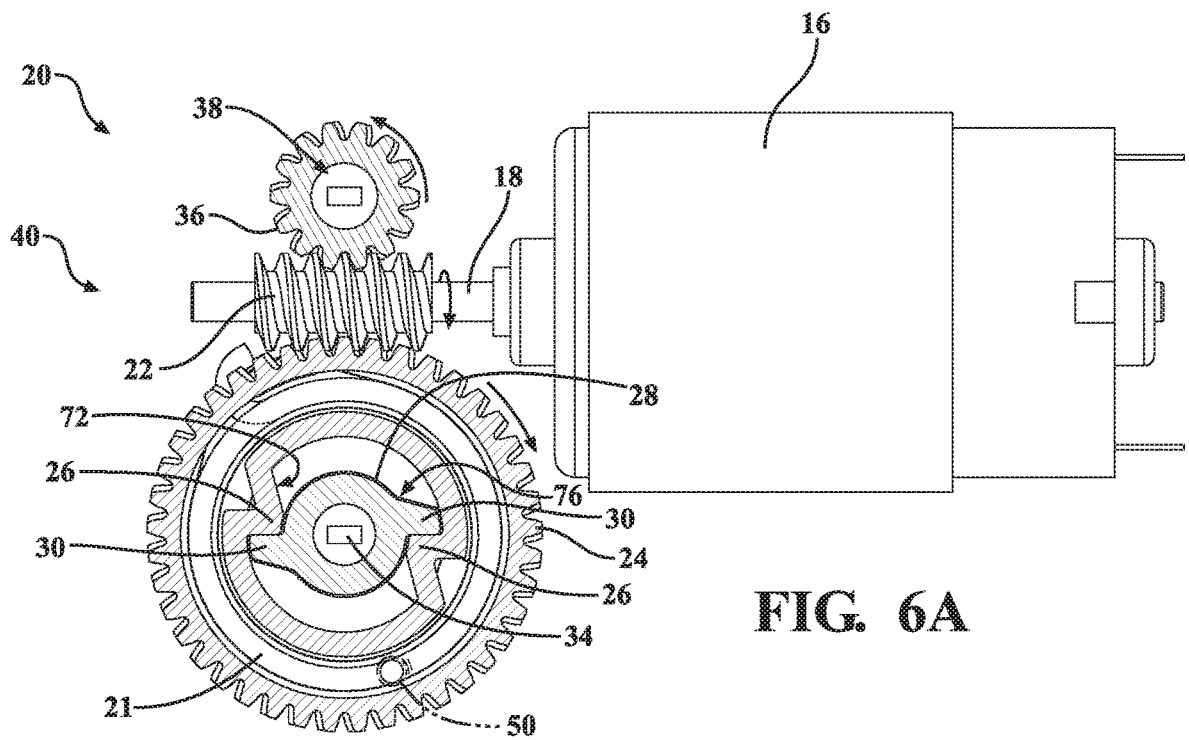
FIGS. 6A and 6B illustrate the actuator assembly moving from an decoupled position to a coupled position.
Figure 6B:
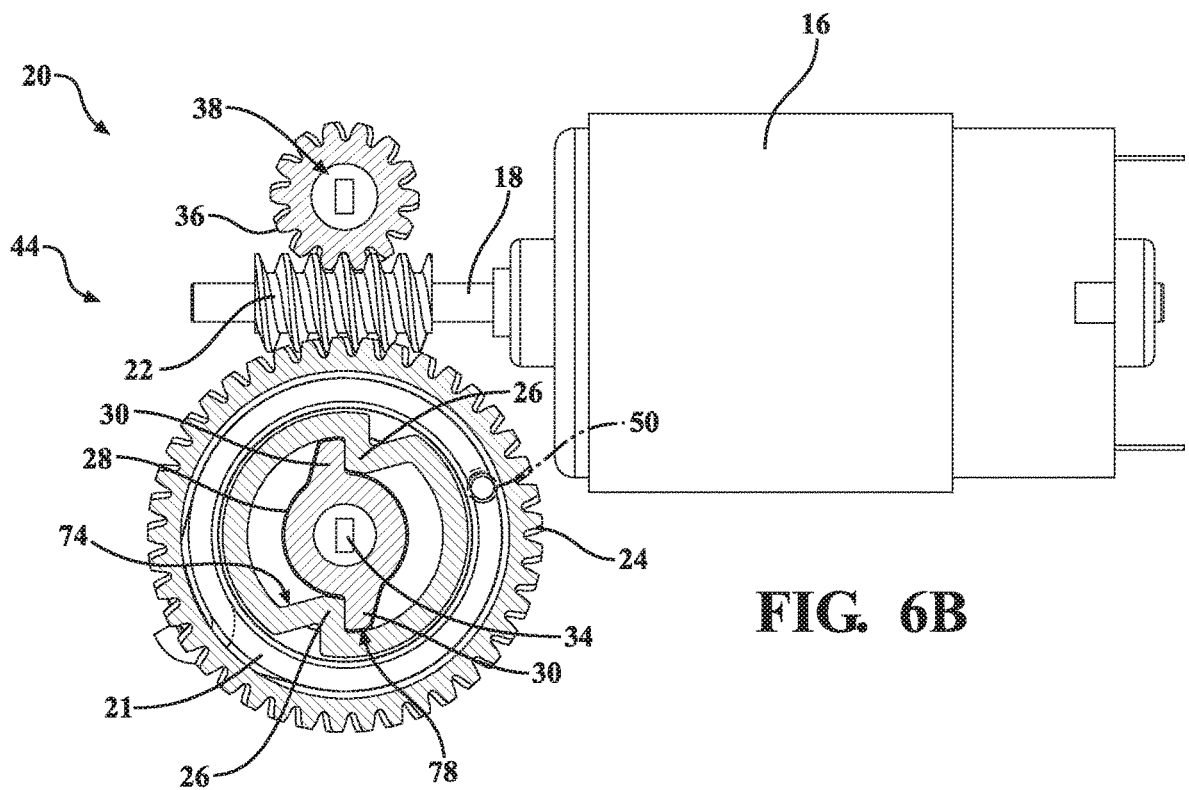
Figure 7A:
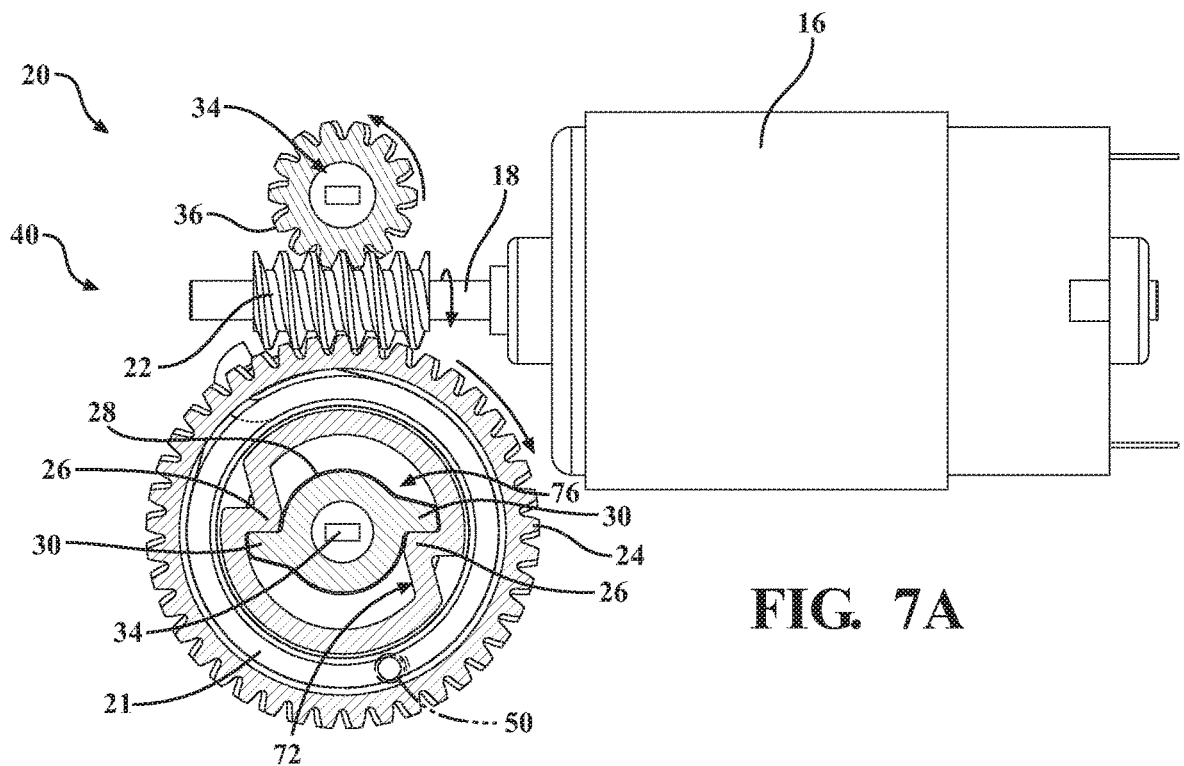
FIGS. 7A-7D illustrate the decoupled position, an intermediate position, and a coupled position of the actuator assembly, respectively.

As seen in FIGS. 5, 6A, and 7A, tabs 26 of the input member 24 and stops 30 of the output member 28 are used to hold the biasing member 21 and the shift assembly 20 in a preloaded state in the decoupled position 40. For example, the biasing member 21 is preloaded between the input member 24 and the actuator output member 28, the tabs 26 and stops 30 are configured to hold the preloaded force of the biasing member 21 such that the tabs 26 are pushing against the stops 30. As the input member 24 turns in the first direction from the first position 72 to the second position 74, the pressure steadily increases as the biasing member 21 is further rotated, applying additional pressure against the actuator output member 28 as biasing member 21 is compressed when there is a blockage condition.

The actuator assembly 12 may include one or more position sensors. In some examples, the actuator assembly 12 may include a plurality of position sensors. The position sensor may be located on or adjacent to the motor 16, input member 24, the housing 14, actuator output member 28, a combination thereof, or any location on or within the actuator assembly 12. The position sensor may function to sense a blockage condition by monitoring the position of the motor 16, the input member 24, actuator output member 28, the biasing member 21, the like, or a combination thereof. In one example, the actuator assembly 12 includes a controller 52 which may be configured to as a part of a position sensor, a part of a motor sensor, or both. Each sensor includes an emitter 34, 38 and receiver 56, 58. In some examples, the emitter 34, 38 may be an active emitter or a passive emitter. In some examples, the emitter 34, 38 is magnet, such as shown in FIGS. 4A-9. The receiver 56, 58 may be configured to sense the position of the emitter 34, 38. In some examples, such as in FIGS. 2-4B, the receiver 56, 58 is part of the controller 52 and may be configured to sense the change in magnetic field as the emitters 34, 38 are moved, respectively. Other methods of sensing are contemplated such as optical, radio, electromagnetic, the like, or a combination thereof.

The actuator assembly 12 may include a motor sensor. The motor sensor may function to signal the position of the motor 16 between the first position 72 and the second position 74 of the input member 24, and the decoupled position 40 and coupled position 44 to the controller 52. The motor sensor may include a motor sensor gear 36 which may be configured as a complementary gear to the actuator gear 22. In some examples, as the output 18 of the motor 16 is actuated the actuator gear 22 is rotated between positions 72, 74, which turns the motor sensor gear 36, which rotates emitter 38 between the positions 72, 74. The receiver 56 determines the position of the emitter 38 and sends a signal to the controller 52 to indicate the position of the motor 16 relative to the position of the actuator output member 28, which is described further below.

The motor sensor gear 36 may be configured to rotate more rotational degrees than the input member 24 transitioning between positions 72, 74 as the motor 16 rotates. By placing the emitter 38 onto the motor sensor gear 36 that is configured to rotate more than the input member 24, the controller 52 may more accurately determine the position of the input member 24. In some examples, the motor sensor gear 36 may rotate two or more times than the input member 24 when the input member 24 is moved between the first position 72 and the second position 74. For examples, the input member 24 may rotate 40 degrees and the motor sensor gear 36 may rotate 80 degrees. The motor sensor gear 36 and emitter 38 are rotated more rotational degrees than the input member 24, allowing the receiver 56 to sense the emitter 38 more than once, decreasing the effect of tolerance deviations and errors between the receiver 56 and the emitter 38 regarding the position of the input member 24. Some examples of tolerance deviations and errors may be free play of the actuator gear 22, input member 24, motor sensor gear 36, or a combination thereof. Other sources of error and/or positional deviation may be assembly variation of the emitter 38, the receiver 56, the motor sensor gear 36, or a combination thereof. Other examples of deviation and error are also considered. In some examples, the motor sensor gear 36 may be configured to rotated three times more than the input member 24 while the input member 24 is moved between positions 72, 74 (e.g. input member 24 rotates 100 degrees, motor sensor gear rotates 300 degrees). In some examples, because the motor sensor gear 36 is rotating more rotational degrees than the input member 24 during every transition, tolerance deviations and sensing errors of the actuator gear 22, emitter 38, motor sensor gear 36, and the receiver 56 are distributed over the additional degrees of rotation, allowing the tolerance deviations and error to be mitigated by a factor greater than one, allowing the controller 52 to more accurately determine the position of the input member 24. For example, the input member 24 may rotate 100 degrees between positions 72, 74 while the motor sensor gear 36 and emitter 38 may complete 200 degrees of rotation, allowing the sensing device 56 at least twice as many sensing positions than if the emitter was located on the input member 24. In some examples, by placing the emitter 38 on the motor sensor gear 36, and the motor sensor gear configured to rotate more degrees than the input member 24, the deviation is distributed by a factor greater than one.

Figure 4A:
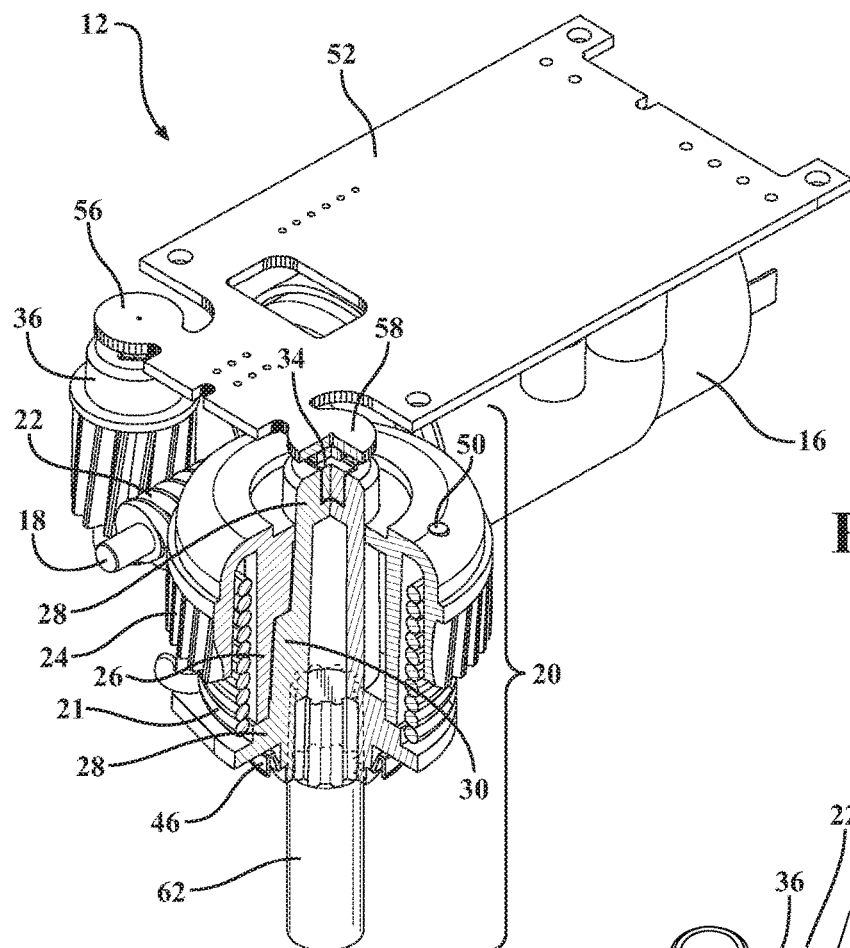
FIGS. 4A and 4B are perspective views of the actuator assembly without the housing.
Figure 4B:
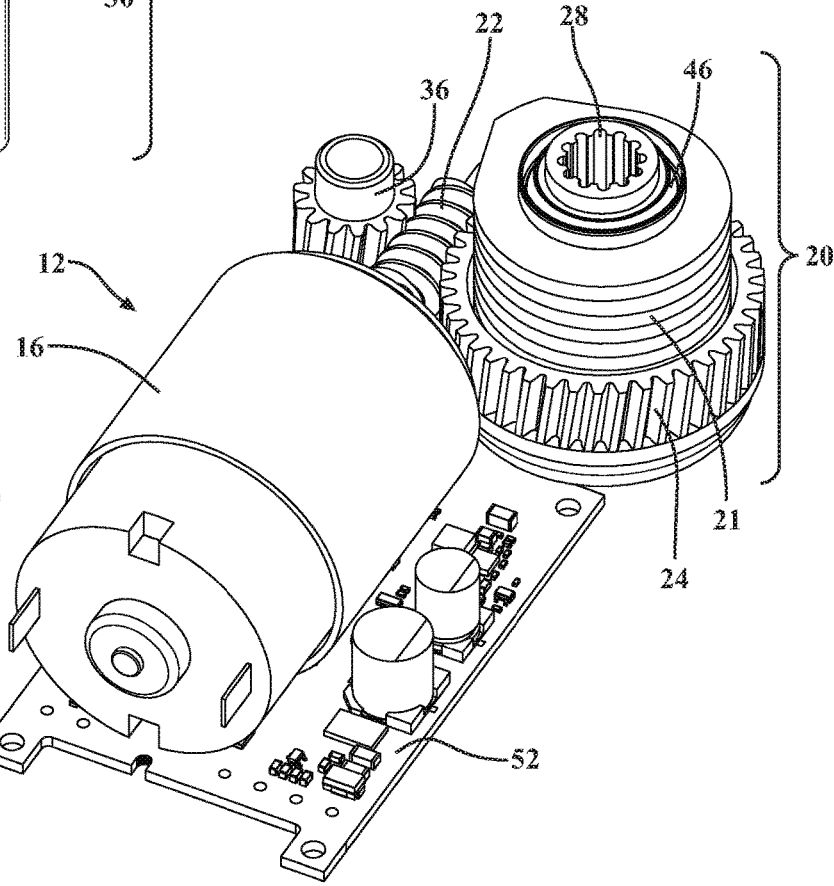
Figure 7B:
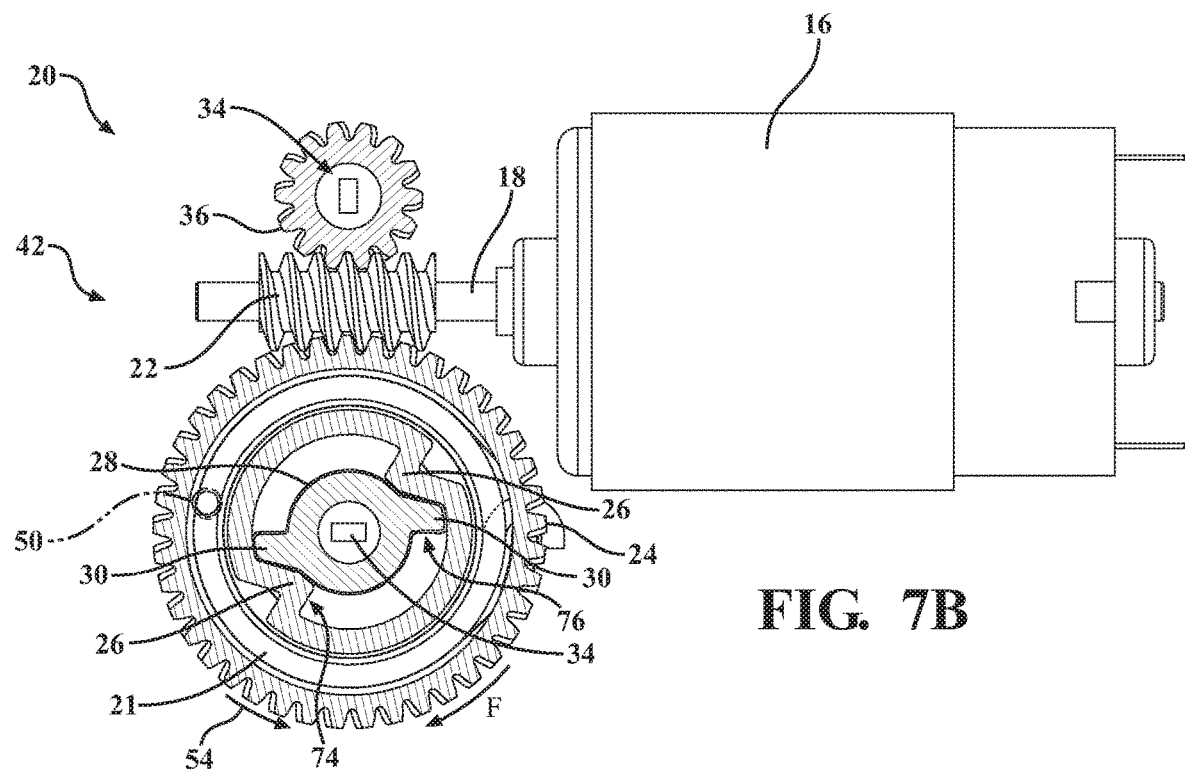

The actuator assembly 12 may include a shift sensor. The shift sensor may function to signal the position of the actuator output member 28 between the disengaged position 76 and the engaged position 78 to the controller 52. In some examples, the shift sensor may be configured as a emitter 34 located on the actuator output member 28 and a receiver 58. For example, FIG. 4A depicts the emitter 34 as a magnet on the actuator output member 28. When the output 18 of the motor 16 is actuated, the actuator gear 22 is rotates the input member 24 between positions 72, 74. When the input member is turned from the first position 72 to the second position 74 without a blockage condition, the actuator output member 28 rotates as the input member 24 is turned, resulting in the emitter 34 being rotated between the disengaged position 76 and the engaged position 78, and sending a signal to the controller 52 to indicate the position of the actuator output member 28. When a blockage condition is present, the motor 16 turns the input member 24 from the first position 72 to the second position 74, but the actuator output member 28 does not move or only partially moves. During the time that the input member 24 is rotated to the second position 74 and the actuator output member 28 is not moved, the shift assembly 20 is in the intermediate position 42 (FIG. 7B). The emitter 34 of shift sensor sends a signal through the receiver 58 on the controller 52, along with the signal from receiver 56, indicating that shift assembly 20 is in the intermediate position 42, since the motor 16 has moved the input member 24 but the actuator output member 28 has remained stationary.

Figure 7C:
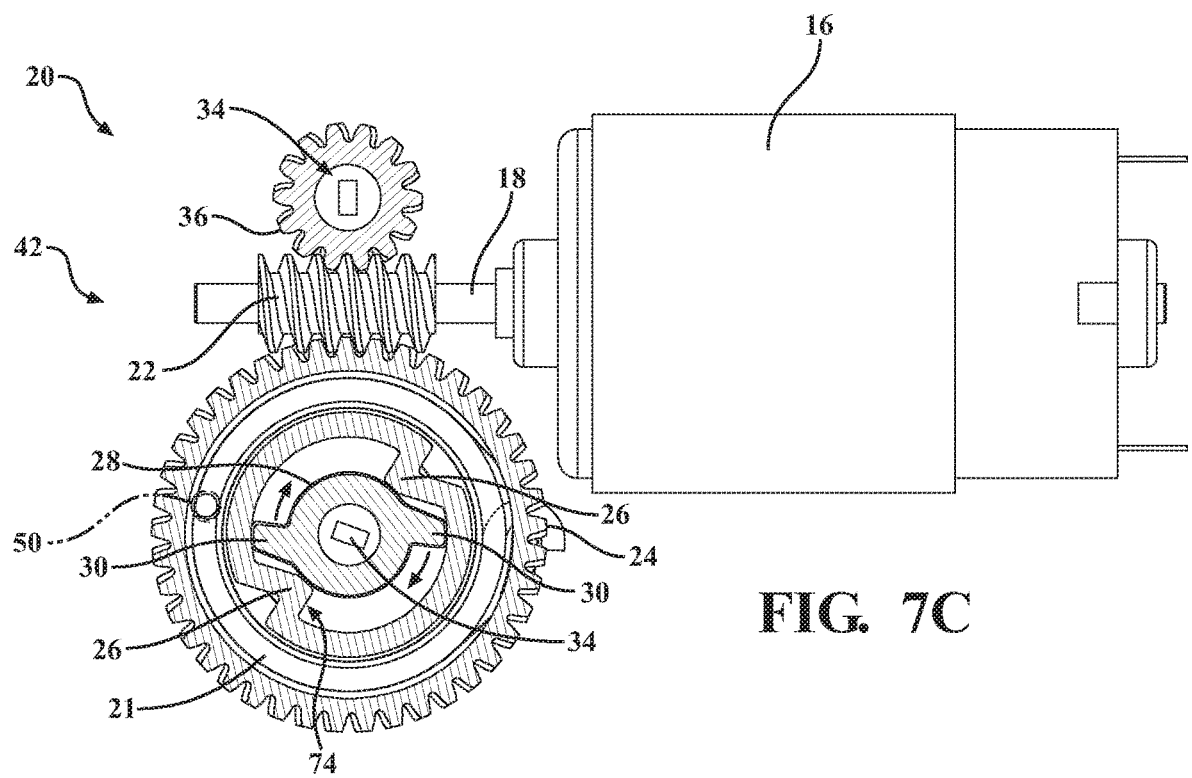
Figure 7D:
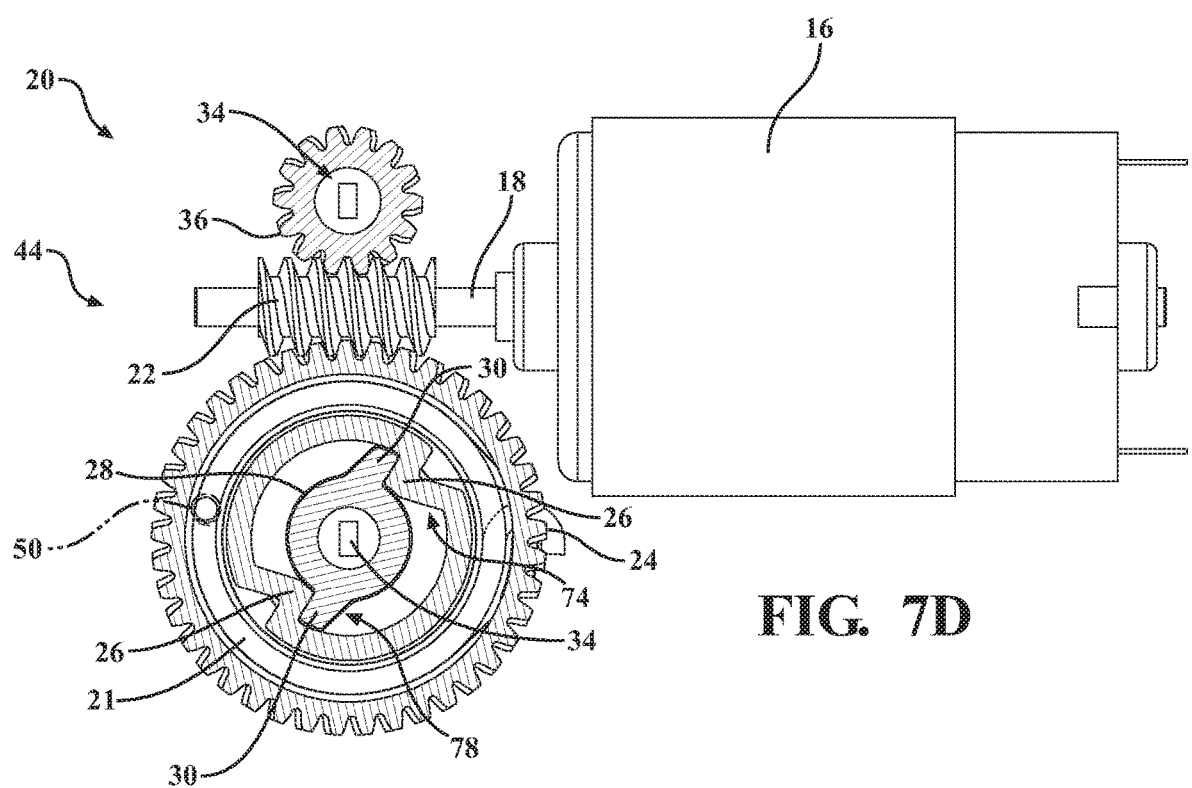

The shift assembly 20 may function to assist the actuator output member 28 in transitioning between the disengaged position 76 and the engaged position 78, which in turn transitions the shift assembly 20 between the decoupled position 40 and the coupled position 44. While moving from the decoupled position 40 to the coupled position 44, when there is a dog-clutch misalignment causing a blockage condition, the shift assembly 20 applies a force F and/or torque through the actuator output member 28 against the shift member 62 of the engagement mechanism 60 (FIG. 7B). FIGS. 7A-7D illustrate a schematic view of the actuator assembly 12 moving from the decoupled position 40 (7A), through an intermediate position 42 when a blockage condition is present (7B, 7C), into a coupled position 44 (7D). In FIG. 7A, the motor 16 is actuated causing the input member 24 and the motor sensor gear 36 to rotate along the actuator gear 22. In FIG. 7B, the input member 24 is fully turned in the first direction from the first position 72 to the second position 74, but the actuator output member 28 has remained in the disengaged position 76. This occurs when a blockage condition is present placing the shift assembly 20 into an intermediate position 42. A resistive force 54 is applied against the actuator output member 28. This resistive force 54 is translated through the actuator output member 28 into the biasing member 21 to the input member 24. The input member 24 and the biasing member 21 work in conjunction with each other tensioning the biasing member 21 against the resistive force 54 applied on the actuator output member 28 (FIG. 7B). The biasing member 21 is loaded to apply force F onto the actuator output member 28 to apply sufficient force to the engagement mechanism 60 to quickly move the dog clutch 68 into the engaged position during the short time window when the teeth of the receiving gear 70 and teeth of the dog clutch 68 are aligned. After tensioning the biasing member 21, the force F is released during the alignment window, rotating the actuator output member 28 from the disengaged position 76 toward the engaged position 78 (as seen in FIG. 7C) transitioning the shift assembly 20 from the intermediate position 42 into the coupled position 44. As noted above, the biasing member 21 is configured with a rotational length long enough to rotate the actuator output member 28 the entire stroke required to move the dog clutch 68 between the disengaged position and the engaged position with the receiving gear, transmitting the velocity and torque to and from the receiving gear 70 and the dog clutch 68, causing both receiving gear 70 and dog clutch 68 to rotate at the same speed. When the shift assembly is in the coupled position 44, the output member 28 is in the engaged position 78 and the emitter 34 of the actuator output sensor has been rotated, signaling to the controller 52 that the actuator output member 28 has successfully engaged the dog clutch 68 with the receiving gear 70, and, additionally how successfully the engagement is (e.g. depth of engagement) and when torque may be applied.

As mentioned above with reference to FIGS. 7B and 7C, the intermediate position 42 occurs when a blockage condition, such as when there is a misalignment between teeth of the dog clutch gear 68 and the receiving gear 70 causing an interference. During a blockage, the resistive force 54 is applied to actuator output member 28 when the actuator assembly 12 is moving between the decoupled position 40 and the coupled position 44. The blockage is caused by a momentary misalignment of the dog clutch 68 with the receiving gear 70, so during this misalignment, the engagement mechanism 60 is pressing against the dog clutch 68 which is pressing against the receiving gear 70. The force 54 is translated through the actuator output member 28 through the biasing member to the input member 24. When the input member 24 is rotated from the first position 72 to the second position 74 and encounters the shift assembly 20 is in the intermediate position 42, the input member 24 tensions the biasing member 21, applying force F onto the actuator output member 28 as the input member 24 is rotated. The loaded force (created by the tension of the biasing member 21) is in the opposite direction of the blockage force 54 exerted on the actuator output member 28. When the input member 24 is rotated to the second position 74 and the blockage persists, the rotation of the input member 24 increases tension on the biasing member 21, storing potential energy, placing the shift assembly 20 in an intermediate position 42. In some examples, such as shown in FIGS. 7B and 7C, the tabs 26 of the input member 24 are free from contacting the stops 30 of actuator output member 28. The stored energy of the biasing member 21 is applied to the actuator output member 28, which may then be applied onto a shift member 62 of the engagement mechanism 60, the dog clutch 68, or both. When the momentary misalignment/blockage is cleared, the stored energy released and translated into a movement force, rotating the actuator output member 28 from the disengaged position 76 to the engaged position 78 through the desired rotational distance, placing the shift assembly 20 into the coupled position 44 (see FIGS. 6B and 7D). The intermediate position 42 may be present going to coupled position 44 from the decoupled position 40. Once in the coupled position 44, the additional tension on the biasing member 21 from the intermediate position 42 is released and the biasing member 21 is applying the pre-loaded force onto the output member 28.

Figure 8A:
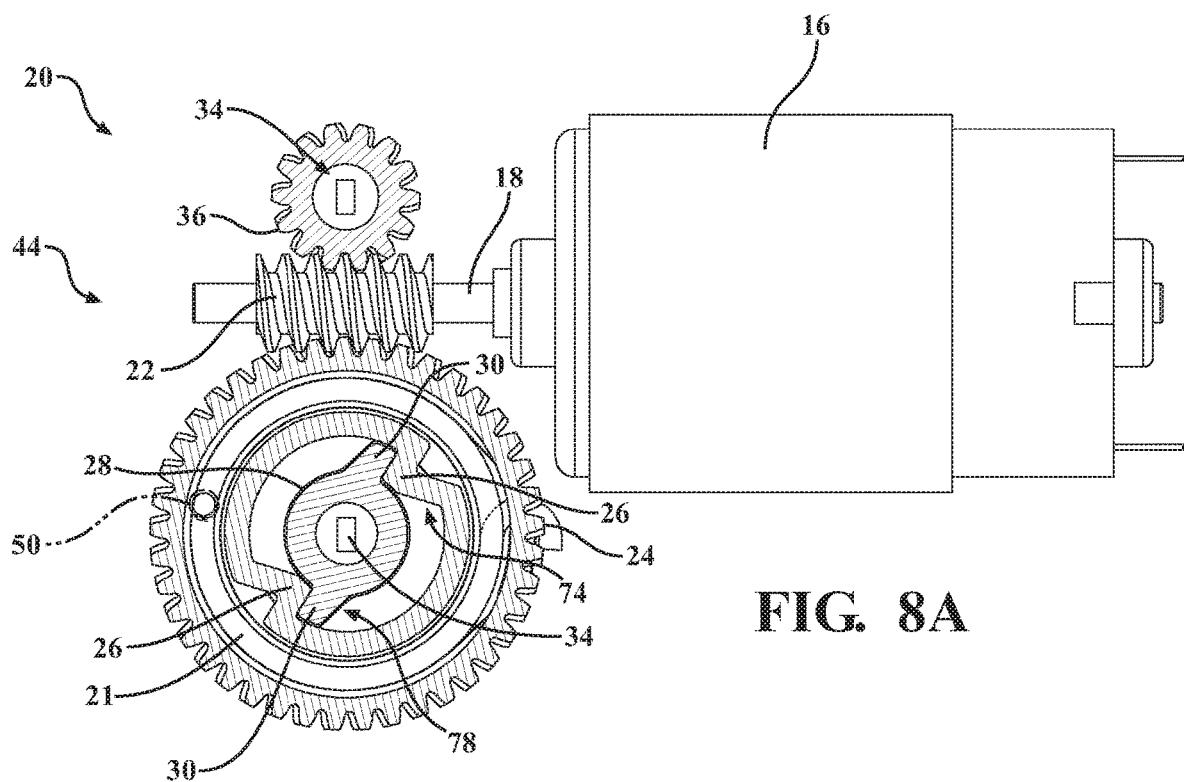
FIGS. 8A and 8B illustrate the actuator assembly moving from the coupled position back to the decoupled position.
Figure 8B:
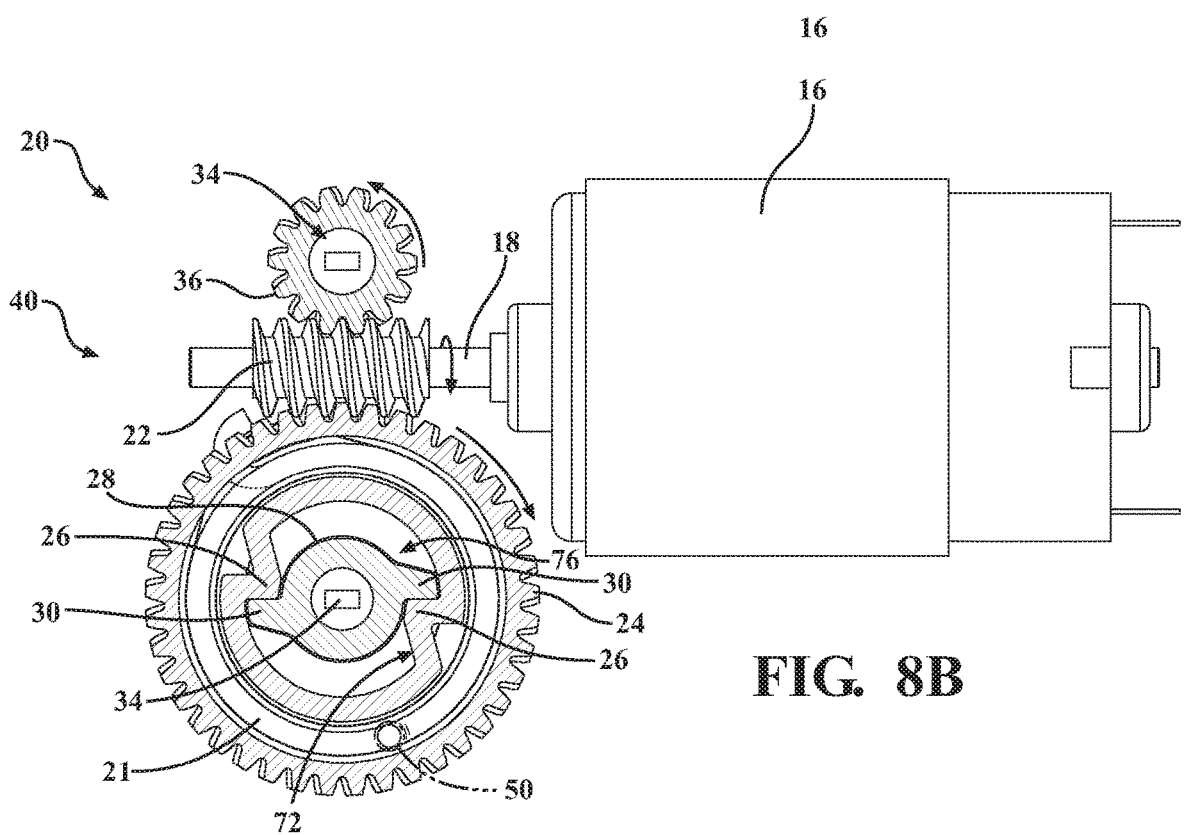
Figure 9:
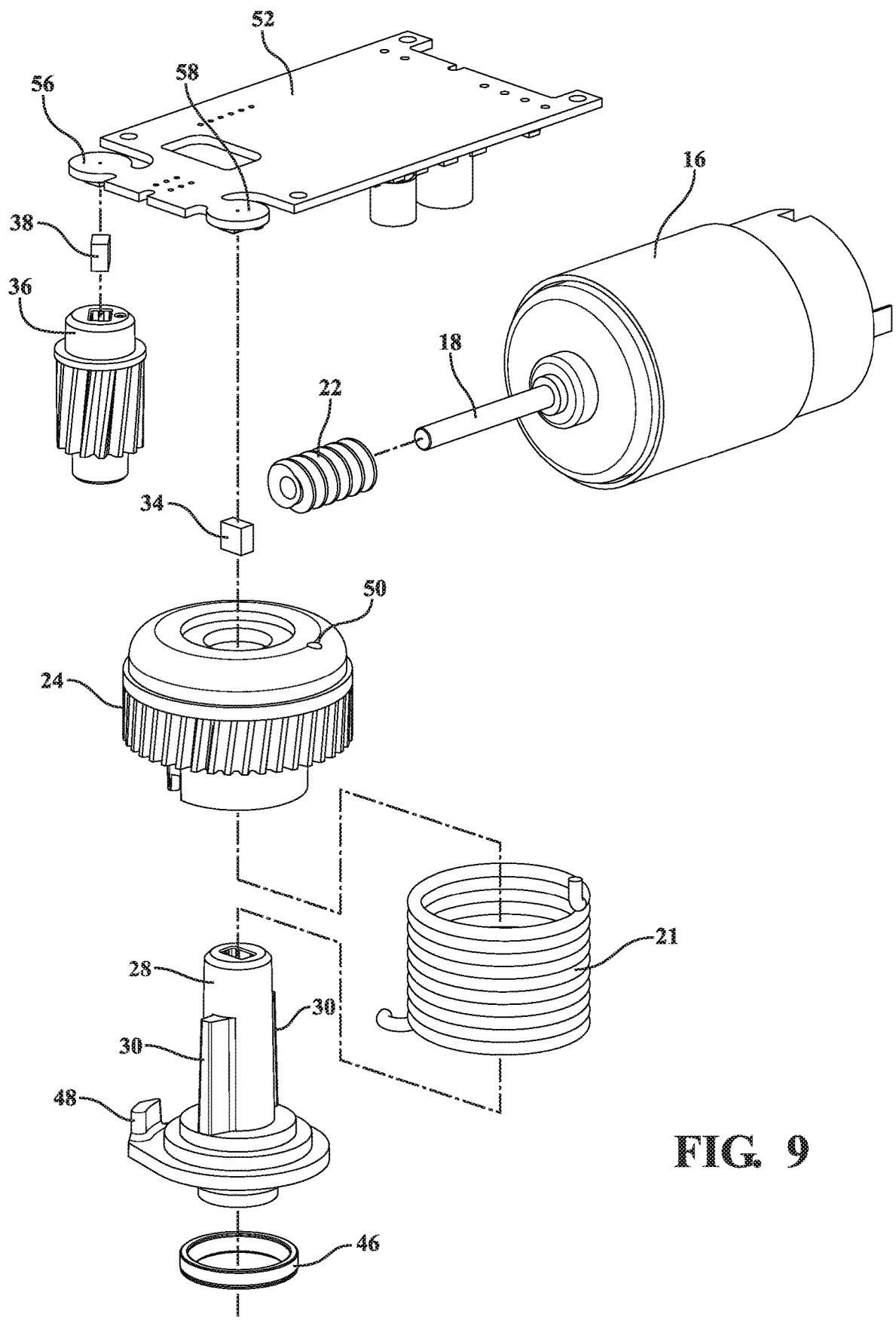
FIG. 9 illustrates an exploded view of the actuator assembly.

FIGS. 8A and 8B schematically illustrating moving the actuator assembly 12 from the coupled position 44 back to the decoupled position 40. As seen in FIG. 8A, the motor 16 is actuated in the opposite direction, rotating the actuator gear 22, which turns input member 24 and the motor sensor gear 36 in a second direction. As the input member 24 is rotated, the tabs 26 on the input member 24 rotate about the output member 28. The tabs 26 then push against the stops 30, rotating the output member 28 in the second direction back into the first position 72 and disengaged position 76, respectively (FIG. 8B). Unlike moving from the first position 72 into the second position 74, the biasing member 21 does not build tension, but rather stays in the preloaded state.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. An actuator assembly comprising:
   a support;
   a motor connected to the support;
   a shift assembly operatively connected with the motor to move between a decoupled position, and a coupled position with a plurality of intermediate positions between the decoupled position and coupled position, the shift assembly including:
      a gear connected to the motor;
      an input member in communication with the gear with the input member having a tab with the input member configured to transition between a first position and a second position, the input member being in the first position when the shift assembly is in the decoupled position;
      an output member having a stop with the output member operatively connected to the input member and configured to move an angular distance defining a stroke length between a disengaged position and an engaged position, the output member being in the disengaged position when the shift assembly is in the decoupled position; and
      a biasing member connecting the input member to the output member wherein the biasing member is held in a pretensioned state when the input member is in the first position and the output member is in the disengaged position such that the stop of the output member engages the tab of the input member;
   wherein the input member rotates in a first direction from the first position to the second position relative to the output member, separating the tab of the input member from the stop of the output member and increasing a tension of the biasing member between the input member and the output member, and the output member remains in the disengaged position due to an interference causing a blocked condition;

wherein the biasing member rotates the output member in the first direction relative to the input member in a releasing condition upon clearance of the interference such that the output member rotates through the angular distance from the disengaged position to the engaged position with the stop of the output member re-engaging the tab of the input member while the input member remains in the second position to place the shift assembly in the coupled position; and wherein the output member is moved from the engaged position to the disengaged position by the input member when the input member is moved in a second direction, moving the input member from the second position to the first position and causing the tab of the input member to engage the stop of the output member and rotate the output member and the input member together in the second direction, placing the actuator assembly back in the decoupled position.

2. The actuator assembly of claim 1, wherein the biasing member has a first end and a second end, the first end of the biasing member is connected to the input member, and the second end of the biasing member is connected to the output member.

3. The actuator assembly of claim 2, wherein at least a portion of the input member includes an opening and the opening surrounds at least a portion of the output member.

4. The actuator assembly of claim 3, wherein the tab extends into the opening of the input member and the stop extends from the output member, the stop and the tab are complementary.

5. The actuator assembly of claim 4, wherein the biasing member is pre-tensioned in the disengaged position by the biasing member applying a pre-tensioned force against a basing member mount of the input member and a basing member on the output member causing the tab of the input member and the stop of the output member to apply the pre-tensioned force against one another.

6. The actuator assembly of claim 1 further comprising a controller in communication with the motor and a sensor in communication the controller, the controller configured to actuate the motor and to determine the position of the shift assembly.

7. The actuator assembly of claim 6, wherein the sensor comprises an emitter and a receiver, with one of the emitter and the receiver operatively connected with the output member, and the other of the emitter and receiver operatively connected with the controller.

8. The actuator assembly of claim 7 further comprises a sensor gear in communication with the gear, the sensor gear having a sensor gear emitter and a sensor gear receiver, with one of the sensor gear emitter and the sensor gear receiver operatively connected with the sensor gear, and the other of the sensor gear emitter and the sensor gear receiver operatively connected with the controller.

9. The actuator assembly of claim 8, wherein the sensor gear and the input member are both rotated when the motor is actuated.

10. The actuator assembly of claim 7, wherein the emitter in communication with the output member is moved when the output member is moved and the controller is configured to determine whether the output member is in the disengaged position or the engaged position by monitoring the emitter on the output member relative to the position of the sensor gear.

11. A method of operating an actuator assembly, the actuator assembly comprising a support, a motor connected to the support, a shift assembly operatively connected with the motor to move between a decoupled position, and a coupled position with a plurality of intermediate positions between the decoupled and coupled positions, the shift assembly including: a gear connected to the motor, an input member in communication with the gear with the input member having a tab with the input member configured to transition between a first position and a second position, the input member being in the first position when the shift assembly is in the decoupled position, an output member having a stop with the output member operatively connected to the input member and configured to rotate an angular distance corresponding to a stroke length between a disengaged position and an engaged position, the output member being in the disengaged position when the shift assembly is in the decoupled position, and a biasing member connecting the input member to the output member wherein the biasing member is held in a pretensioned state when the input member is in the first position and the output member is in the disengaged position such that the stop of the output member engages the tab of the input member, the method comprising:

actuating the motor in a first direction to rotate the gear and the input member from the first position to the second position;

increasing tension of the biasing member between the input member and the output member, separating the tab of the input member from the stop of the output member, the output member remaining in the disengaged position when an interference is present causing a blocked condition;

clearing the blocked condition;

releasing the tension of the biasing member and rotating the output member through the angular distance from the disengaged position to the engaged position in the first direction;

re-engaging the stop of the output member with the tab of the input member while the input member remains in the second position to place the shift assembly in the coupled position;

wherein the output member is moved from the engaged position to the disengaged position by the input member when the input member is moved in a second direction, moving the input member from the second position to the first position and causing the tab of the input member to engage the stop of the output member and rotate the output member and the input member together in the second direction, placing the actuator assembly back in the decoupled position.

12. The method of claim 11 further comprising:

moving the input member from the second position towards the first position in the second direction;

engaging the tab of the input member with the stop of the output member;

rotating the output member with the input member in the second direction to move the output member from the engaged position to the disengaged position;

rotating the output member and the input member together in the second direction, placing the actuator assembly in the decoupled position.

13. The method of claim 11, wherein the actuator assembly further comprising a controller in communication with the motor and a sensor in communication the controller, the controller configured to actuate the motor and to determine the position of the shift assembly.

14. The method of claim 13, wherein the sensor comprises a emitter and a receiver, with the emitter operatively connected with the output member, and the receiver operatively connected with the controller.

15. The method of claim 14 further comprising:
rotating the emitter with the output member when the output member is moved from the disengaged position toward the engaged position;
monitoring the angle of rotation of the emitter on the output member and
determining with the controller whether the output member is in the disengaged position or the engaged position through the angle of rotation of the emitter on the output member.

16. The method of claim 14 further comprising a sensor gear in communication with the gear connected to the motor, the sensor gear having a sensor gear emitter and a sensor gear receiver, with one of the sensor gear emitter and the sensor gear receiver operatively connected with the sensor gear, and the other of the sensor gear emitter and the sensor gear receiver operatively connected with the controller, wherein the sensor gear and the input member are both rotated when the motor is actuated.

17. The method of claim 16, wherein the sensor gear is rotated at least three more times than the input member between the first position and the second position.

* * * * *